(12) United States Patent
Echevarria Vallespi et al.

(10) Patent No.: US 12,014,043 B2
(45) Date of Patent: Jun. 18, 2024

(54) SYSTEMS FOR ACCESSIBLE DIGITAL PAINTING

(71) Applicant: Adobe Inc., San Jose, CA (US)

(72) Inventors: Jose Ignacio Echevarria Vallespi, Belmont, CA (US); Jinjin Sun, Brooklyn, NY (US); Emelia May Hughes, Bellevue, WA (US)

(73) Assignee: Adobe Inc., San Jose, CA (US)

( * ) Notice: Subject to any disclaimer, the term of this patent is extended or adjusted under 35 U.S.C. 154(b) by 76 days.

(21) Appl. No.: 17/709,880

(22) Filed: Mar. 31, 2022

(65) Prior Publication Data

US 2023/0315281 A1 Oct. 5, 2023

(51) Int. Cl.
G06F 3/04883 (2022.01)
G06F 3/01 (2006.01)
G06F 3/16 (2006.01)

(52) U.S. Cl.
CPC .......... *G06F 3/04883* (2013.01); *G06F 3/016* (2013.01); *G06F 3/167* (2013.01)

(58) Field of Classification Search
CPC ....... G06F 3/04883; G06F 3/016; G06F 3/167
See application file for complete search history.

(56) References Cited

U.S. PATENT DOCUMENTS

| | | | | |
|---|---|---|---|---|
| 9,182,897 B2* | 11/2015 | Rogers | ................ | G06F 3/0485 |
| 10,268,273 B1* | 4/2019 | Sundaram | ............ | G06F 3/0346 |
| 10,902,645 B2 | 1/2021 | Chen | | |
| 2013/0127867 A1* | 5/2013 | Tijssen | ................ | G06T 11/203 |
| | | | | 345/173 |
| 2013/0249809 A1* | 9/2013 | Kawalkar | ........... | G06F 3/04886 |
| | | | | 345/173 |
| 2016/0283049 A1* | 9/2016 | Faydi | ................. | G06F 3/04842 |
| 2019/0196782 A1* | 6/2019 | Chudge | ................ | G06F 3/0481 |
| 2019/0384402 A1* | 12/2019 | Huizar | ............... | G06F 3/03545 |

* cited by examiner

*Primary Examiner* — Angie Badawi
(74) *Attorney, Agent, or Firm* — FIG. 1 Patents

(57) ABSTRACT

In implementations of systems for accessible digital painting, a computing device implements a landmark system to receive input data describing a coordinate of a first type of user interaction in a user interface of a digital canvas. The landmark system determines that the coordinate of the first type of user interaction is within a threshold distance of a coordinate of a digital landmark that corresponds to a visual feature of a visual layer of the digital canvas. Feedback is generated that indicates the coordinate of the first type of user interaction is within the threshold distance of the coordinate of the digital landmark. Additional input data is received describing a coordinate of a second type of user interaction in the user interface based on the feedback. The landmark system generates a stroke of digital paint for display in the user interface based on the additional input data.

20 Claims, 11 Drawing Sheets

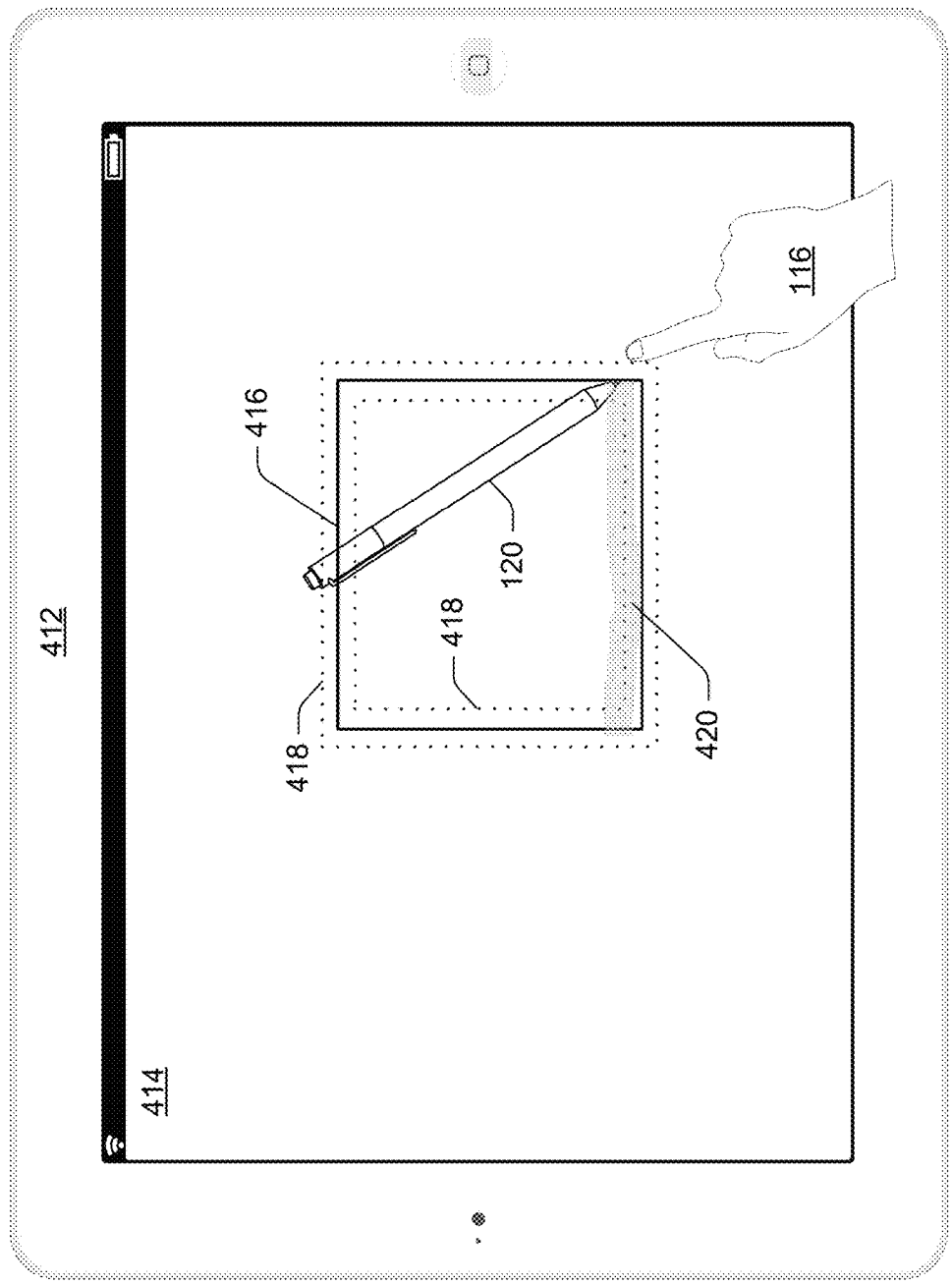

SYSTEMS FOR ACCESSIBLE DIGITAL PAINTING

BACKGROUND

Systems for digital painting simulate physical paint and a physical canvas using digital paint and a digital canvas. For instance, a user of a system for digital painting interacts with an input device (e.g., a stylus, a touchscreen, a mouse, etc.) within a user interface of the digital canvas. As the user manipulates the input device in the user interface, the system for digital painting renders strokes of digital paint on the digital canvas based on input data received from the input device.

For example, the user visually identifies portions of the user interface to receive digital paint, physically manipulates the input device relative to the user interface to apply digital paint to the identified portions, and visually confirms that strokes of digital paint are rendered relative to the identified portions of the user interface. However, for users with low vision or no vision, a visual identification of a portion of a user interface to receive digital paint is not possible. As a result, conventional systems for digital painting are not accessible to these users which is a shortcoming of the conventional systems.

SUMMARY

Techniques and systems are described for accessible digital painting. In an example, a computing device implements a landmark system to receive input data describing a coordinate of a first type of user interaction in a user interface of a digital canvas. For example, the first type of user interaction is a manipulation of a finger of a hand in the user interface. The landmark system determines that the coordinate of the first type of user interaction is within a threshold distance of a coordinate of a digital landmark that corresponds to a visual feature of a visual layer of the digital canvas.

Feedback is generated that indicates the coordinate of the first type of user interaction is within the threshold distance of the coordinate of the digital landmark. Additional input data is received describing a coordinate of a second type of user interaction in the user interface based on the feedback. In one example, the second type of user interaction is a manipulation of a pen or stylus in the user interface. The landmark system generates a stroke of digital paint in the visual layer for display in the user interface based on the additional input data.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 4A, 4B, 4C, 4D, 4E, and 4F illustrate an example of a user interface of a digital canvas for accessible digital painting.

DETAILED DESCRIPTION

Overview

Figure 1:
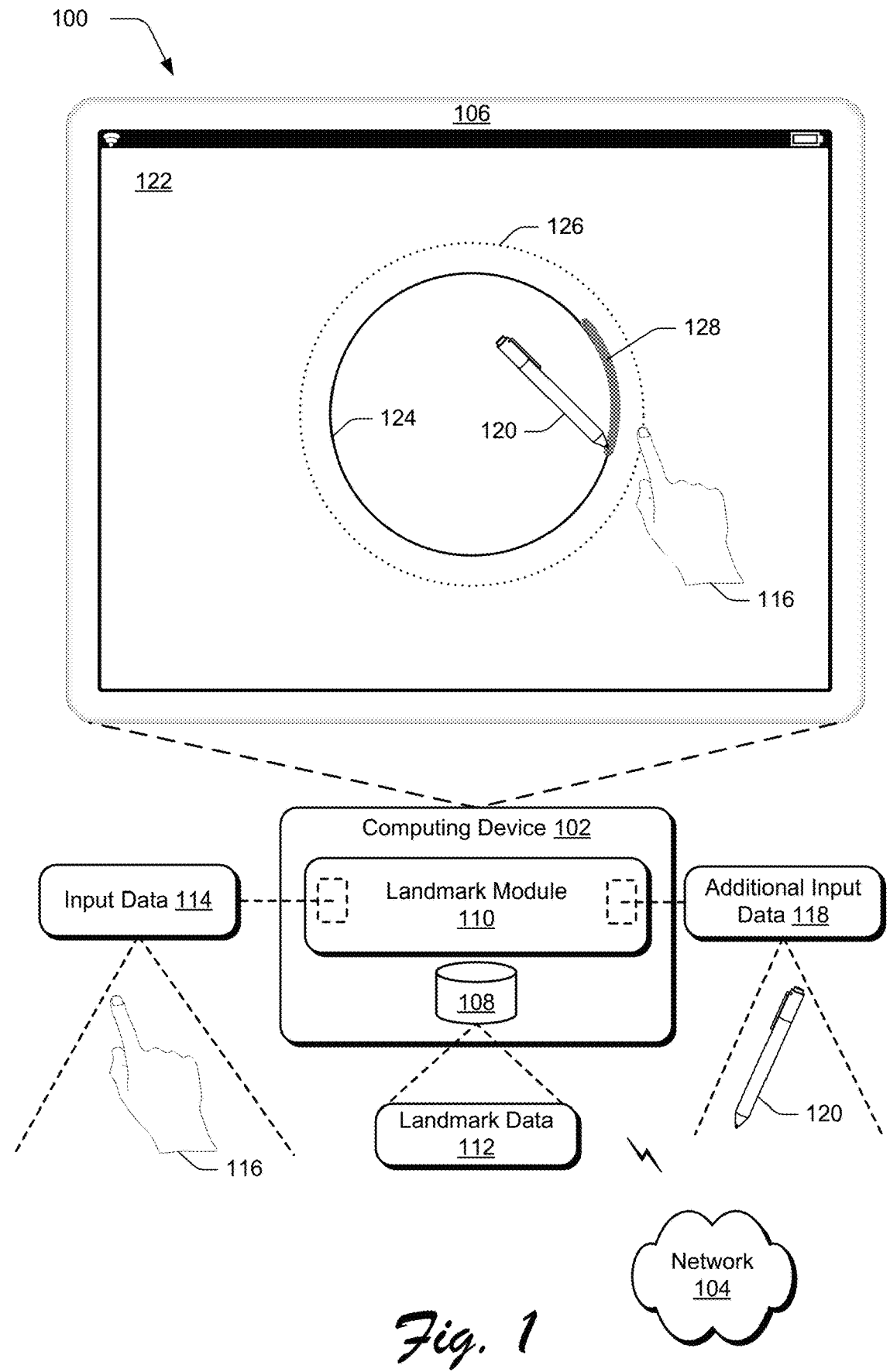
FIG. 1 is an illustration of an environment in an example implementation that is operable to employ digital systems and techniques for accessible digital painting as described herein.

In conventional systems for digital painting, a user visually identifies portions of a digital canvas to receive digital paint, and the user interacts in a user interface of the digital canvas (e.g., with a finger or a stylus) to add strokes of digital paint to the visually identified portions of the digital canvas. Because users with low vision or no vision are unable to visually identify the portions of the digital canvas to receive the digital paint, the conventional systems are not accessible to these users. In order to overcome the shortcomings of conventional systems, techniques and systems are described for accessible digital painting.

In one example, a computing device implements a landmark system to receive input data describing a coordinate of a first type of user interaction in a user interface of a digital canvas. For example, the first type of user interaction is a manipulation of a finger of a hand in the user interface and the coordinate corresponds to a location of the finger in the user interface. The landmark system determines that the coordinate of the first type of user interaction is within a threshold distance of a coordinate of a digital landmark that corresponds to a visual feature of a visual layer of the digital canvas.

For instance, the digital landmark is included in a landmark layer of the digital canvas that aligns the digital landmark with the visual feature of the visual layer. In one example, the visual feature is a digital object displayed in the user interface and the digital landmark is not displayed in the user interface. The landmark system generates feedback that indicates the coordinate of the first type of user interaction is within the threshold distance of the coordinate of the digital landmark.

Since the coordinate of the first type of user interaction corresponds to the location of the finger in the user interface and because the landmark layer aligns the digital landmark with the visual feature displayed the user interface, the location of the finger in the user interface is also within the threshold distance of a coordinate of the visual feature. The feedback indicates to a user with low vision or no vision that the finger of the hand (e.g., the user's hand) is within the threshold distance of the visual feature in the user interface.

For example, the feedback is non-visual feedback such as audio feedback and/or tactile feedback and the user with low vision leverages the feedback to locate the visual feature in the user interface. To do so in one example, the user with low vision drags the finger of the hand within the user interface until the landmark system generates the feedback. In this example, receiving the feedback indicates to the user with low vision that the finger of the hand is within the threshold distance of the visual feature in the user interface.

After locating the visual feature in the user interface, the user performs a second type of user interaction in the user interface based on the feedback and a location of the finger of the hand in the user interface. In one example, the user with low vision performs the second type of user interaction by manipulating a stylus with the user's other hand and guiding the stylus to the location of the finger of the hand in the user interface. The stylus is now in a position of the user interface that corresponds to a position of the visual feature in the user interface and the user interacts with the stylus in the user interface to add strokes of digital paint to the visual feature.

By generating feedback based on digital landmarks included in landmark layers, the described systems for digital painting are accessible to users with low vision or no vision. This is not possible in conventional systems which require users to visually identify portions of a digital canvas to receive digital paint. Additionally, the described systems simulate physical landmarks and tactile feedback used by users with low vision for physically painting a physical canvas. Accordingly, the described systems are usable by these users with minimal training, e.g., to increase the accessibility of the described systems. The described systems are also capable of modifying or modulating the feedback based on a distance between the coordinate of the first type of user interaction a coordinate of a digital landmark in the user interface. For example, the modified feedback indicates whether the distance is increasing or decreasing which facilitates accessible digital painting with greater accuracy and precision.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and a landmark module 110. The storage device 108 is illustrated to include landmark data 112.

For example, the landmark data 112 describes digital landmarks included in landmark layers and visual features included in visual layers of an application for digital painting. The landmark layers are similar to the visual layers of the application for digital painting which are usable to group or isolate particular visual features as part of creating or editing digital artwork. In some examples, the landmark layers and the digital landmarks that these layers contain are not displayed visually whereas the visual layers and corresponding visual features are displayed visually by the application for digital painting.

The landmark module 110 is illustrated as having, receiving, and/or transmitting input data 114. For instance, the input data 114 describes a first type of user interaction such as a user interaction performed with a hand 116. The landmark module 110 is also illustrated as having, receiving, and/or transmitting additional input data 118. The additional input data 118 describes a second type of user interaction, e.g., a user interaction performed using a pen or a stylus 120.

Consider an example in which a user generates the input data 114 and/or the additional input data 118 by interacting in a user interface 122 of a digital canvas. In this example, the user has low vision or no vision and conventional systems for digital painting are not usable by the user. Because conventional systems for digital painting are not accessible to users with low vision, the user is limited to physically painting on a physical canvas. To do so in one example, the user includes physical landmarks on the physical canvas such as pins, specifically textured elements, specifically shaped elements, cords, and so forth. The user then locates the physical landmarks via tactile feedback using one hand (e.g., the user's non-dominant hand), and applies paint to a location of the physical canvas associated with a located physical landmark using the user's other hand (e.g., the user's dominant hand).

As shown, the user interface 122 includes a digital object 124 which is a circle. For example, the user interacts in the user interface 122 to sketch the digital object 124 using the hand 116 or the stylus 120. The landmark module 110 receives the input data 114 and/or the additional input data 118 describing the user's interactions to sketch the digital object 124, and the landmark module 110 processes the input data 114 and/or the additional input data 118 to render the digital object 124 in the user interface 122. In one example, the landmark module 110 includes a duplicate version of the digital object 124 in a landmark layer as a digital landmark 126. In this example, the landmark layer aligns the digital landmark 126 with a perimeter of the digital object 124.

For example, the user interacts in the user interface 122 to indicate an intent to sketch the digital object 124 such as by double tapping the stylus 120 in the user interface 122. The landmark module 110 receives the input data 114 and/or the additional input data 118 describing the intent to sketch the digital object 124. In response, the landmark module 110 includes a duplicate version of each object sketched in the user interface 122 in a landmark layer until the user interacts in the user interface 122 to indicate an intent to stop sketching such as by double tapping the stylus 120 in the user interface 122 a second time.

In other examples, the landmark module 110 generates the digital landmark 126 in the landmark layer regardless of whether the user sketches the digital object 124 in the user interface 122. For example, the landmark module 110 is capable of segmenting the digital object 124 in the user interface 122 to generate a mask or an outline of the digital object 124 and the landmark module 110 includes the mask or the outline of the digital object 124 in the landmark layer as the digital landmark 126. In another example, the landmark module 110 detects and bounds the digital object 124 within a bounding object using a machine learning model trained on training data to detect and bound digital objects within bounding objects. In this other example, the landmark module 110 includes the bounding object for the digital object 124 in the landmark layer as the digital landmark 126.

In order to apply strokes of digital paint on or around the digital object 124, the user performs a first type of user interaction in the user interface 122, for example, to locate digital object 124 by locating the digital landmark 126. In one example, the user drags a finger of the hand 116 within the user interface 122 of the digital canvas to locate the digital landmark 126. The landmark module 110 receives the input data 114 describing a coordinate of the first type of user interaction in the user interface 122 (e.g., a coordinate of the finger of the hand 116).

For example, the user with low vision or no vision manipulates the finger of the hand 116 in the user interface 122 to generate the input data 114 which describes a coordinate of the user interface 122 corresponding to a location of the finger of the hand 116 in the user interface 122. In this example, the manipulation of the finger of the hand 116 in the user interface 122 is the first type of user interaction in the user interface 122. Continuing the example, the landmark module 110 processes the input data 114 and the landmark data 112 which describes the digital landmark 126 to determine a distance between the coordinate of the first type of user interaction (e.g., the manipulation of the finger of the hand 116) and a coordinate of the digital landmark 126 within the user interface 122.

As illustrated in FIG. 1, the user drags the finger of the hand 116 within the user interface 122 until the distance between the coordinate of the first type of user interaction and the coordinate of the digital landmark 126 is less than a threshold distance. For instance, the landmark module 110 determines that the distance between the coordinate of the first type of user interaction and the coordinate of the digital landmark 126 is less than the threshold distance. Based on this determination, the landmark module 110 generates feedback such as audio feedback and/or tactile feedback that indicates to the user that the finger of the hand 116 is in a location of the user interface 122 that corresponds to a location of the digital object 124. For example, the feedback is non-visual feedback and the user leverages the feedback to locate the digital object 124 within the user interface 122 in a manner which is possible with or without visually locating the digital object 124.

Consider an example in which the feedback is audio feedback output by speakers of the display device 106 and/or the computing device 102. In this example, landmark module 110 is capable of adjusting a volume or a frequency of the audio feedback to provide additional feedback. For instance, the landmark module 110 modifies the feedback based on the distance between the coordinate of the first type of user interaction and the coordinate of the digital landmark 126. For example, the landmark module 110 increases or decreases the volume or the frequency of the audio feedback based on the distance between the coordinate of the first type of user interaction and the coordinate of the digital landmark 126.

In an example, the landmark module 110 increases the volume or the frequency of the audio feedback as the distance between the coordinate of the first type of user interaction and the coordinate of the digital landmark 126 is decreased. In this example, the user leverages the increases or decreases in the volume or the frequency of the audio feedback to determine whether the finger of the hand 116 is closer to or further from the digital object 124 as the user manipulates the finger of the hand 116 in the user interface 122. In a similar example, the feedback is tactile feedback (e.g., haptic feedback) and the landmark module 110 increases or decreases a magnitude of the tactile feedback based on the distance between the coordinate of the first type of user interaction and the coordinate of the digital landmark 126.

Upon receiving the feedback and using the feedback to identify a location in the user interface 122 to be painted with digital paint, the user performs a second type of user interaction in the user interface 122. For example, the user grasps the stylus 120 using the user's other hand and guides the stylus 120 towards the finger of the hand 116 which the user is also capable of manipulating to receive additional feedback based on the distance between the coordinate of the first type of user interaction and the coordinate of the digital landmark 126. In this example, the user selectively applies the stylus 120 to the user interface 122 to generate the additional input data 118. For instance, the additional input data 118 describes coordinates of the user interface 122 corresponding to positions of the stylus 120 as the user performs the second type of user interaction in the user interface 122.

The landmark module 110 receives and processes the additional input data 118 to render a stroke of digital paint 128 in the user interface 122. As shown, the stroke of digital paint 128 accurately follows a geometry of the digital object 124 even though the user performed the second type of user interaction in the user interface 122 to create the stroke of digital paint 128 without viewing the geometry of the digital object 124. For instance, interacting in the user interface 122 using the finger of the hand 116 to identify a location for applying digital paint and using the user's other hand to manipulate the stylus 120 to apply the digital paint to the identified location simulates a manner in which the user with low vision paints using physical paint and the physical landmarks. Because of this, the user is able to digitally paint using the described systems with minimal training.

The landmark module 110 is also capable of receiving additional inputs to facilitate accessible digital painting. For example, the user provides the additional inputs (e.g., voice commands) which cause the landmark module 110 to change a type of feedback provided (e.g., switch from tactile feedback to audio feedback), add additional landmark layers to the digital canvas, remove a landmark layer from the digital canvas, and so forth. In one example, the user provides an additional input which causes the landmark module 110 to stop generating feedback based on the distance between the coordinate of the digital landmark 126 the coordinate in the user interface 122 that corresponds to the finger of the hand 116. In this example, the landmark module 110 begins generating feedback based on a distance between the coordinate of the digital landmark 126 and a coordinate in the user interface 122 that corresponds to a tip of the stylus 120. Thus, in this example, the user receives the feedback based on a position of the stylus 120 in the user interface 122 rather than the position of the finger of the hand 116 in the user interface 122.

Figure 2:
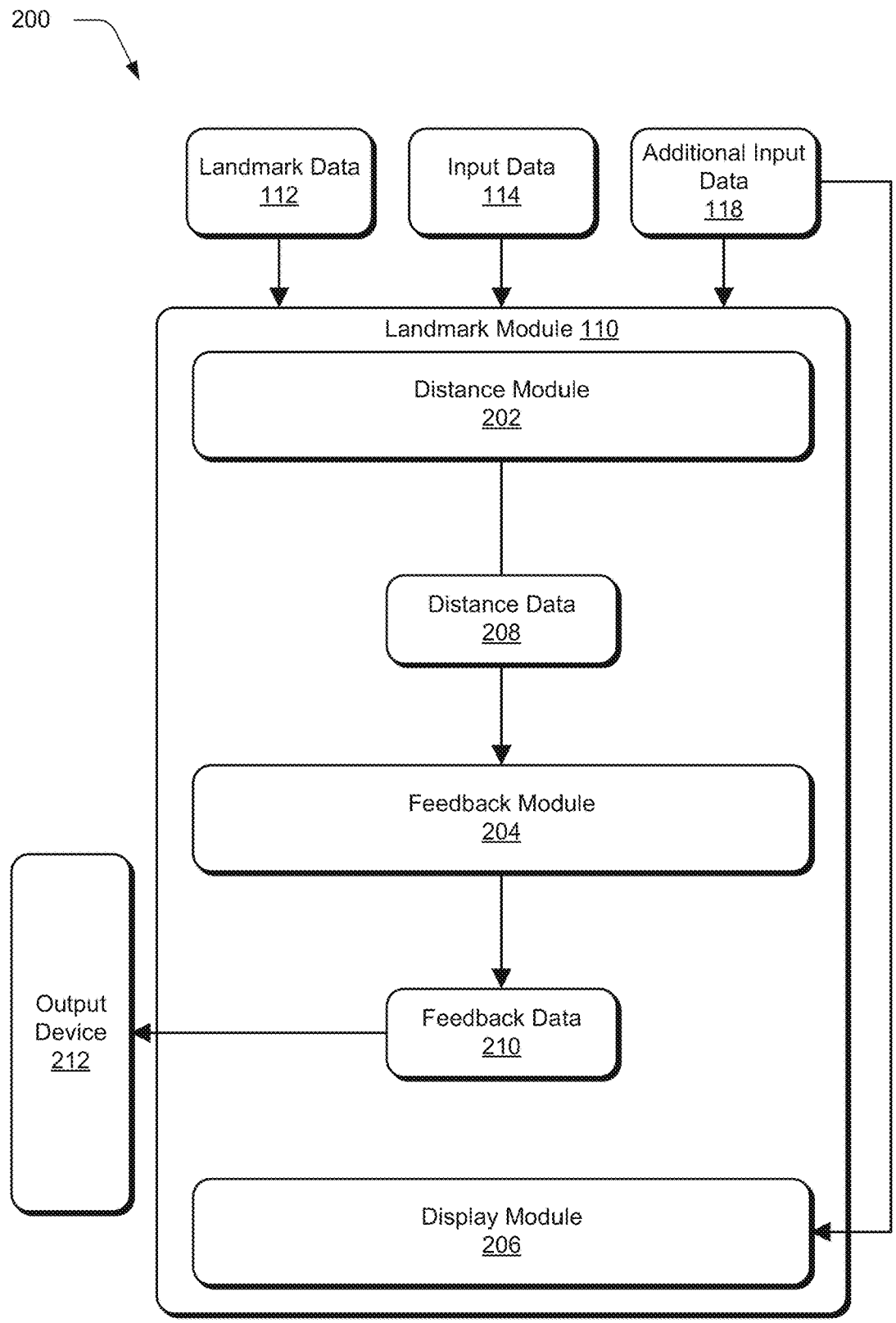
FIG. 2 depicts a system in an example implementation showing operation of a landmark module for accessible digital painting.

FIG. 2 depicts a system 200 in an example implementation showing operation of a landmark module 110. The landmark module 110 is illustrated to include a distance module 202, a feedback module 204, and a display module 206. For example, the landmark module 110 is illustrated as having, receiving, and/or transmitting the landmark data 112 that describes digital landmarks included in landmark layers of a digital canvas and visual features included in visual layers of the digital canvas, the input data 114 that describes coordinates of a first type of user interaction in the user interface 122, and the additional input data 118 that describes coordinates of a second type of user interaction in the user interface 122.

Figure 3:
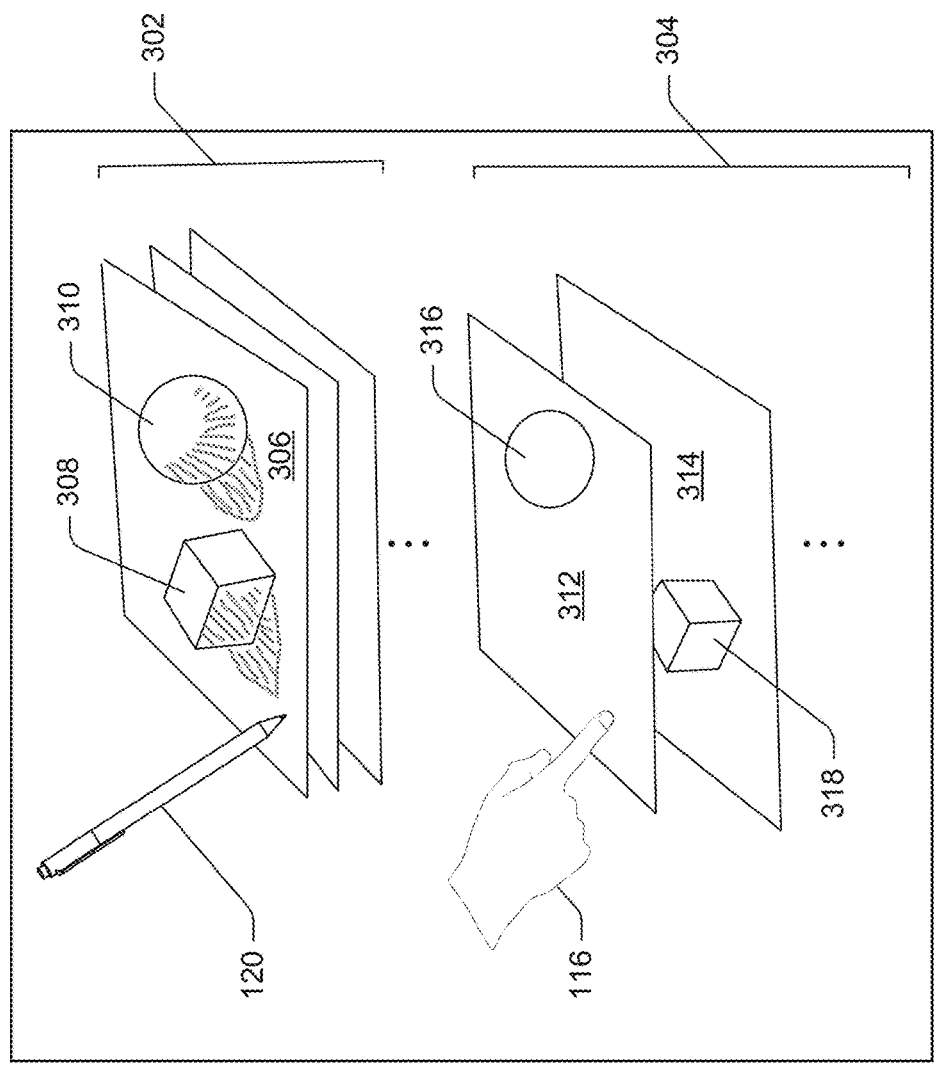
FIG. 3 illustrates a representation of visual layers and landmark layers of systems for accessible digital painting.

FIG. 3 illustrates a representation 300 of visual layers and landmark layers of systems for accessible digital painting. As shown, the representation 300 includes visual layers 302 and landmark layers 304. An example visual layer 306 of the visual layers 302 organizes visual features such as a first digital object 308 and a second digital object 310. A first landmark layer 312 and a second landmark layer 314 both correspond to the visual layer 306.

The first landmark layer 312 includes a first digital landmark 316 which corresponds to the second digital object 310. In one example, the user selects the first landmark layer 312 by providing inputs such as voice inputs. The user interacts in the user interface 122 using the finger of the hand 116 and the landmark module 110 generates feedback based on a distance between a coordinate of the finger of the hand 116 and a coordinate of the first digital landmark 316 in the user interface 122. For example, the user identifies a location of the first digital landmark 316 based on the feedback which is also a location of the second digital object 310.

In this example, the user holds the stylus 120 in the user's other hand and applies the stylus 120 to the identified location to digitally paint the second digital object 310. As shown, the user applies the stylus to 120 to the location of the second digital object 310 to generate the additional input data 118 and the landmark module 110 receives and processes the additional input data 118 to render strokes of digital paint relative to the second digital object 310. The rendered strokes of digital paint cause the second digital object 310 to have a three-dimensional appearance by adding shadowing to the second digital object 310.

The second landmark layer 314 includes a second digital landmark 318 that corresponds to the first digital object 308. For example, the user selects the second landmark layer 314 using a voice input and manipulates the finger of the hand 116 in the user interface 122. The landmark module 110 generates feedback based on a distance between a coordinate of the finger of the hand 116 and a coordinate of the second digital landmark 318 in the user interface 122.

In an example, the user identifies a location of the second digital landmark 318 which is also a location of the first digital object 308 based on the feedback. The user's other hand manipulates the stylus 120 to apply the stylus 120 to the location of the first digital object 308 which generates the additional input data 118 describing coordinates of the user interface 122 contacted by the stylus 120. The landmark module 110 receives and processes the additional input data 118 to render strokes of digital paint relative to the first digital object 308. For instance, the rendered strokes of digital paint cause the first digital object 308 to have a three-dimensional appearance by adding shadowing to the first digital object 308.

Figure 4A:
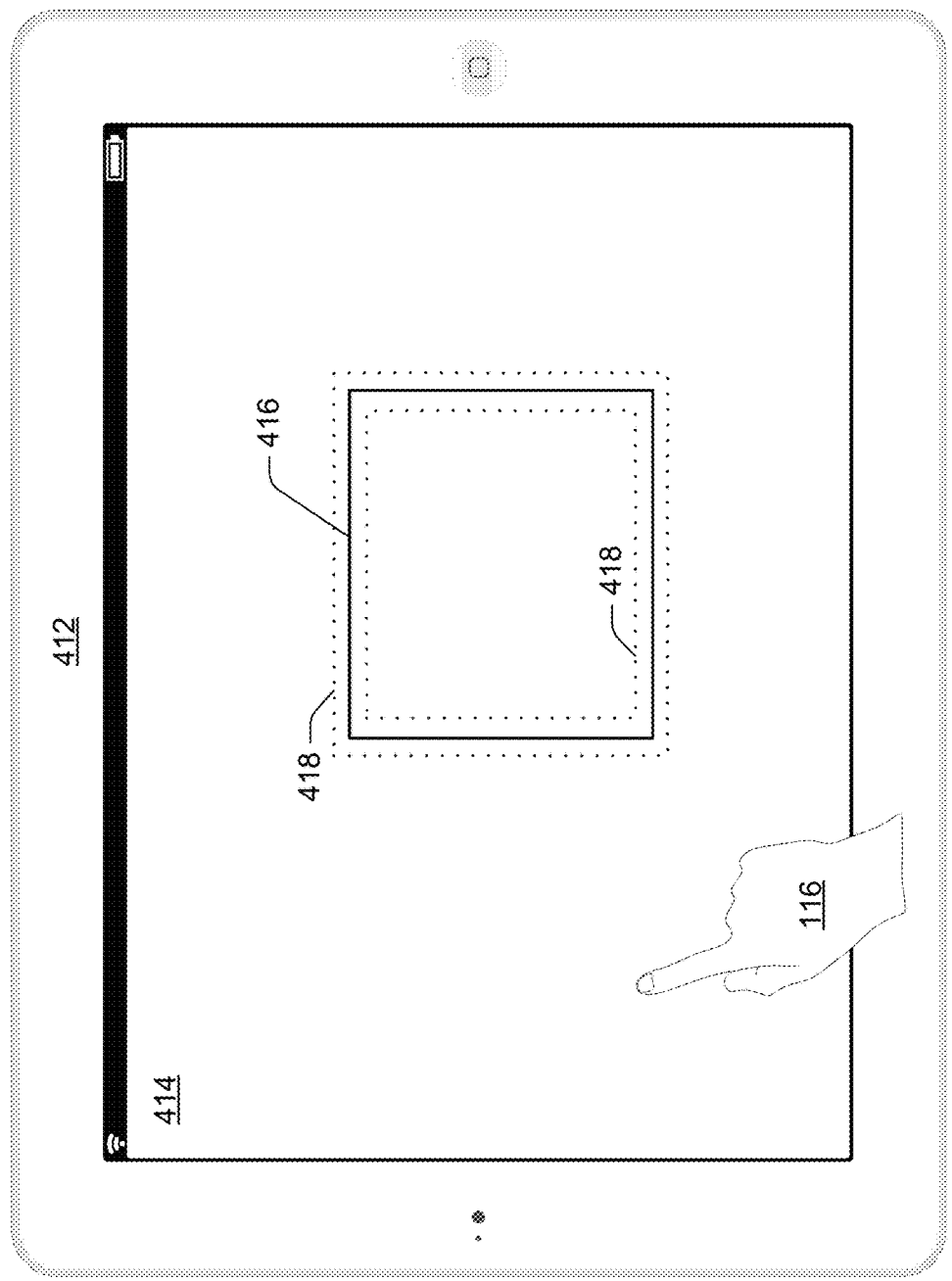
Figure 4B:
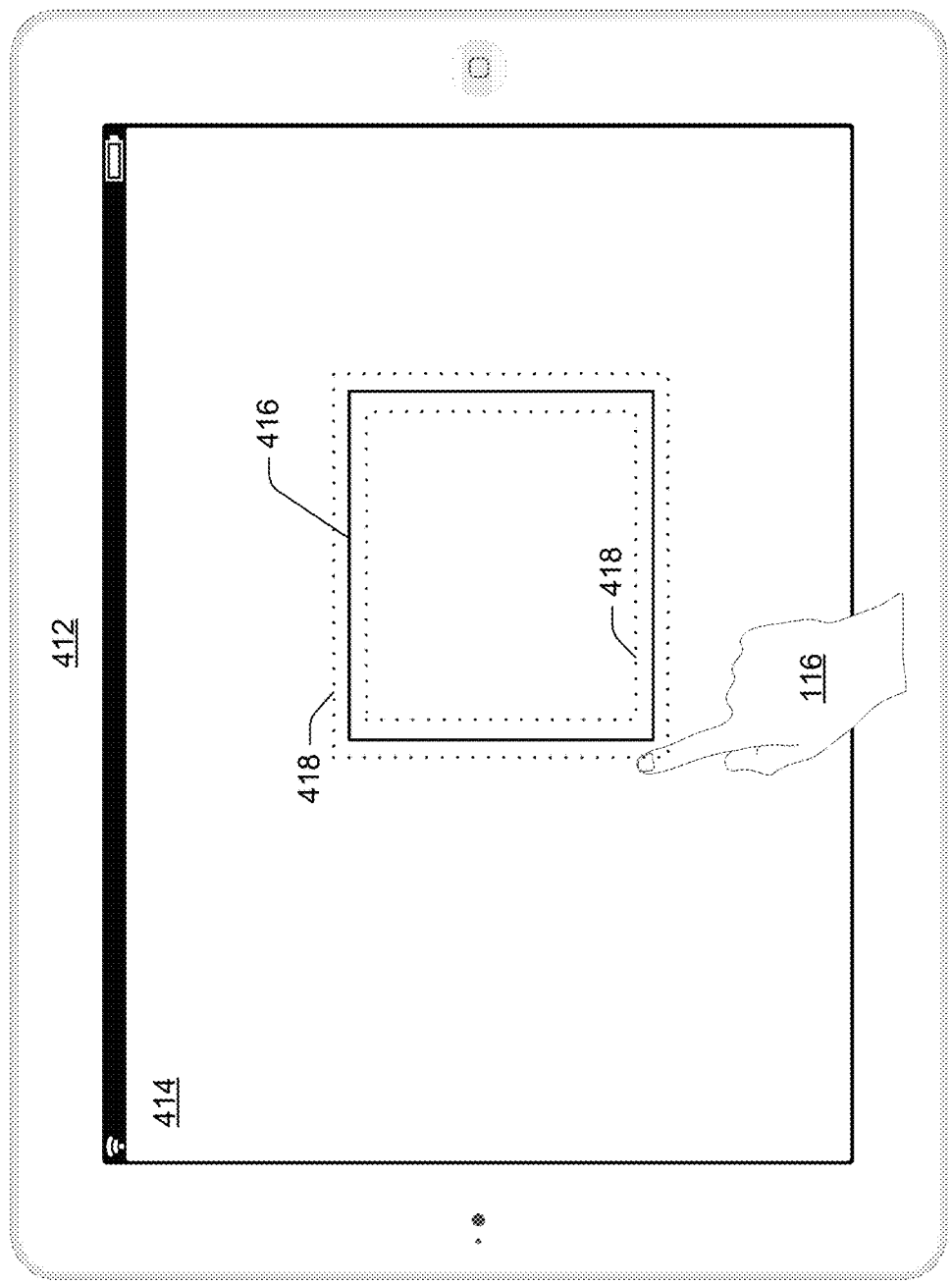
Figure 4C:
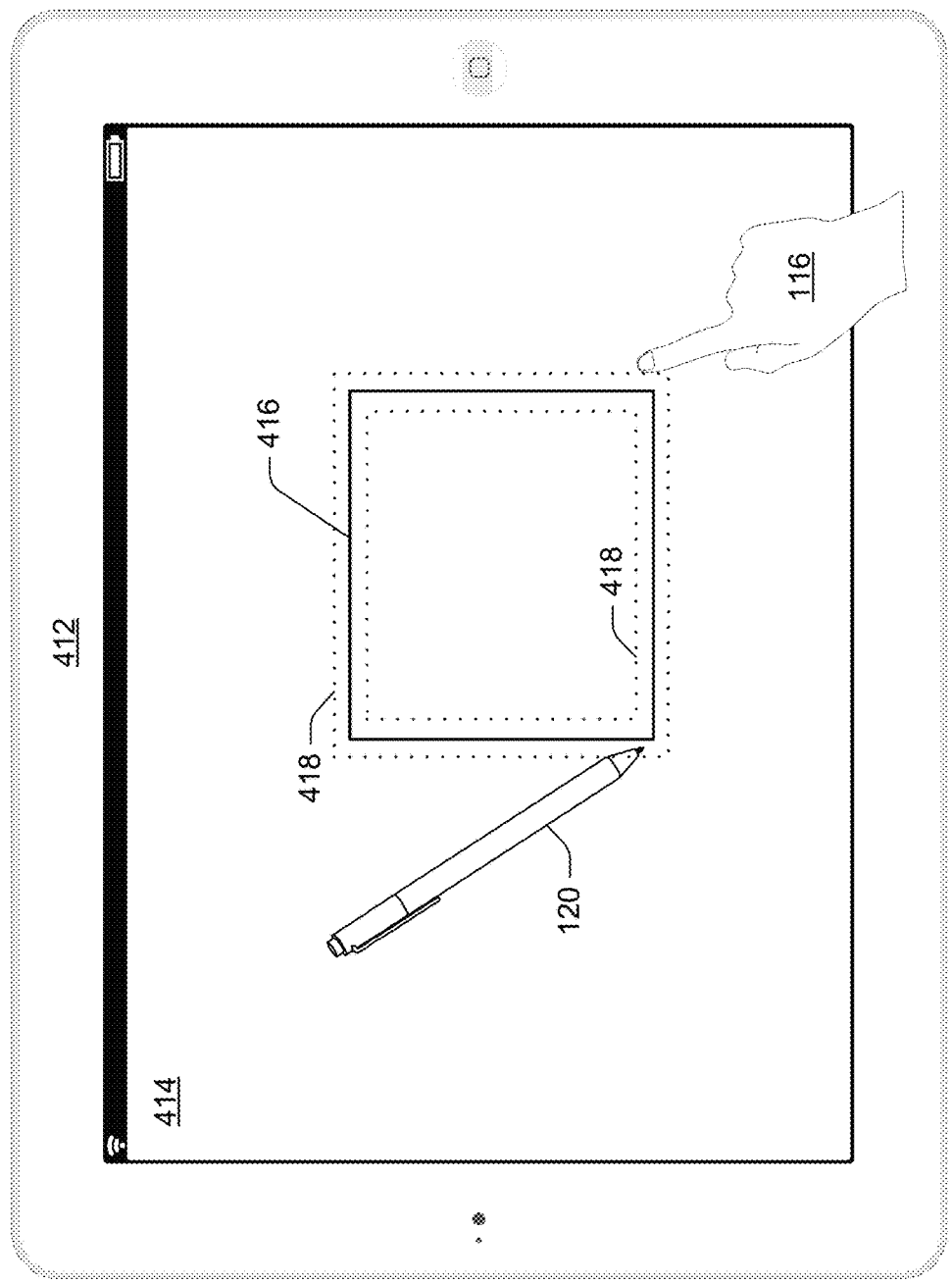
Figure 4E:
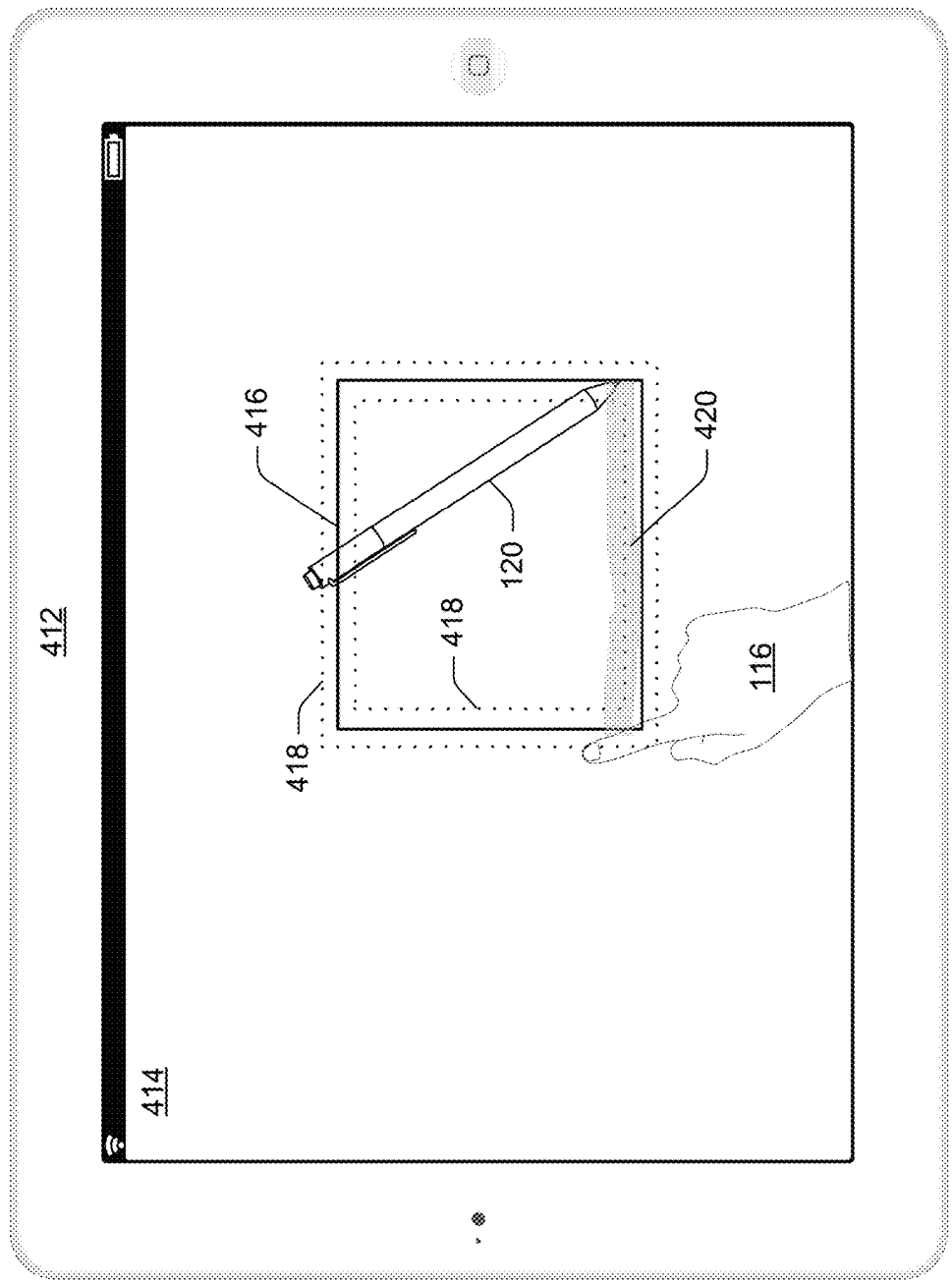
Figure 4B:
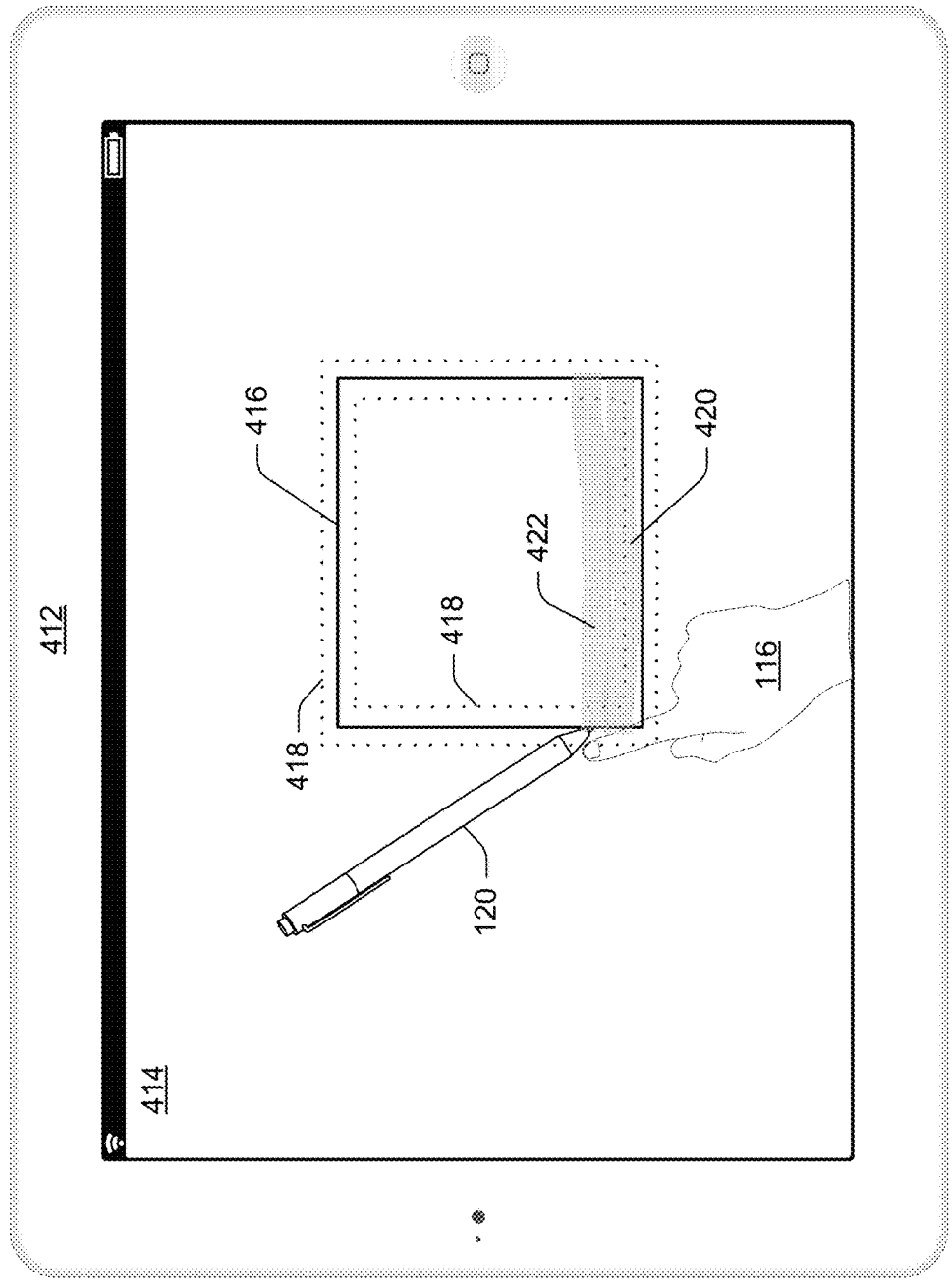

With reference to FIG. 2, the distance module 202 receives the landmark data 112 and/or the input data 114, and the distance module 202 processes the landmark data 112 and/or the input data 114 to generate distance data 208. FIGS. 4A, 4B, 4C, 4D, 4E, and 4F illustrate an example of a user interface of a digital canvas for accessible digital painting. FIG. 4A illustrates a representation 400 of a first type of user interaction in the user interface. FIG. 4B illustrates a representation 402 of a located digital landmark. FIG. 4C illustrates a representation 404 of a second type of user interaction in the user interface. FIG. 4D illustrates a representation 406 of first rendered stroke of digital paint. FIG. 4E illustrates a representation 408 of a relocated digital landmark. FIG. 4F illustrates a representation 410 of a second rendered stroke of digital paint.

The representation 400 of FIG. 4A includes a display device 412 and a user interface 414 of the display device 412. A visual feature 416 of a visual layer is displayed in the user interface 414. A digital landmark 418 of a landmark layer is locatable in the user interface 414 to locate a position of the visual feature 416 in the user interface 414. For example, the visual feature 416 is displayed in the user interface 414 and the corresponding digital landmark 418 is not displayed in the user interface 414.

Consider an example in which a user interacts with an input device (e.g., a mouse, the stylus 120, a finger of the hand 116 and a touchscreen, a microphone, a keyboard, etc.) relative to the user interface 414 to generate the landmark data 112 which describes the visual feature 416 of the visual layer and the digital landmark 418 of the landmark layer. In this example, the user interacts with the input device relative to the user interface 414 to indicate an intent to track the user's interactions in the user interface 414 which sketch portions of visual features in the visual layer by duplicating the sketched portions of the visual features in the landmark layer. For example, the user indicates the intent to track the user's interactions in the user interface 414 by double tapping the stylus 120 in the user interface 414. In another example, the user indicates the intent to track the user's interactions in the user interface 414 by providing a voice input such as "tracking on" or "new landmark layer." A variety of types of interactions are capable of indicating the intent to track the user's interactions in the user interface 414 such as types of interactions which require minimal effort for the user with low vision to perform and/or that do not conflict with predefined types of interactions in the user interface 414 that correspond to other functionality of an application for digital painting.

Continuing the previous example, the user indicates the intent to track the user's interactions in the user interface 414 and then interacts in the user interface 414 (e.g., using the finger of the hand 116) to sketch the visual feature 416 in the visual layer. As the user interacts in the user interface 414 to sketch the visual feature 416 in the visual layer, the interactions are duplicated in the landmark layer as the digital landmark 418. In this way, the user generates the landmark data 112 as describing the visual layer with the visual feature 416 (displayed in the user interface 414) and the landmark layer with the digital landmark 418 (not displayed in the user interface 414). Because the digital landmark 418 duplicates or reproduces a geometry of the visual feature 416, coordinates of the user interface 414 that correspond to portions of the digital landmark 418 also correspond to portions of the visual feature 416.

In the illustrated example, the digital landmark 418 reproduces the visual feature 416 completely; however, it is to be appreciated that in many scenarios digital landmarks of landmark layers do not completely reproduce visual features of visual layers. Rather, digital landmarks reproduce a portion of a corresponding visual feature such as an outline or a boundary of the visual feature. For example, the user with low vision specifies which portions of visual features are reproduced in a corresponding digital landmark by indicating an intent not to track the user's interactions in the user interface 414. In an example, the user tracks interactions in the user interface 414 in which the user sketches an outline of a visual feature in the visual layer which is reproduced as a digital landmark in the landmark layer. In this example, the user indicates the intent not to track the user's interactions in the user interface 414 by double tapping the stylus 120 in the user interface 414 again or providing a voice input of "tracking off" or "stop tracking." For instance, the user then interacts in the user interface 414 to add shading to the outline of the visual feature which is not reproduced as the digital landmark in the landmark layer.

As shown in FIG. 2, the distance module 202 receives the landmark data 112 which describes the visual feature 416 of the visual layer as well as the digital landmark 418 of the landmark layer. For example, the distance module 202 processes the landmark data 112 to determine coordinates of the digital landmark 418 in the user interface 414. The user with low vision performs a first type of user interaction in the user interface 414 by dragging the finger of the hand 116 within the user interface 414 to generate the input data 114 which describes coordinates of the finger of the hand 116 in the user interface 414.

For example, before generating the input data 114, the user indicates an intention to generate the input data 114 by pressing the finger of the hand 116 against the user interface 414 for a period of time (e.g., one second, two seconds, three seconds, etc.). For instance, the user indicates the intention to generate the input data 114 by performing a sequence of gestures in the user interface 414 that do not conflict with predefined gestures corresponding to other functionality of an application for digital painting. After, for example, pressing the finger of the hand 116 against the user interface 414 for the period of time, the user drags the finger of the hand 116 within the user interface 414 to generate the input data 114. In one example, the distance module 202 processes the landmark data 112 and the input data 114 to determine a distance between the coordinates of the user interface 414 that correspond to the finger of the hand 116 and the coordinates of the user interface 414 that correspond to the digital landmark 418. The distance module 202 generates the distance data 208 as describing the distance between the coordinates of the user interface 414 that correspond to the finger of the hand 116 and the coordinates of the user interface 414 that correspond to the digital landmark 418.

The feedback module 204 receives and processes the distance data 208 to generate feedback data 210. To do so in one example, the feedback module 204 determines whether the coordinates that correspond to the finger of the hand 116 are within a threshold distance of the coordinates of the digital landmark 418 in the user interface 414. For instance, the feedback module 204 determines the threshold distance to be several pixels away from an inner portion of the visual feature 416 and several pixels away from an outer portion of the visual feature 416.

In an example in which the feedback module 204 determines that the coordinates which correspond to the finger of the hand 116 are within the threshold distance of the coordinates of the digital landmark 418, the feedback module 204 generates the feedback data 210 as describing an indication that the finger of the hand 116 is within the threshold distance of the digital landmark 418. Because the digital landmark 418 is generated based on the visual feature 416, for example, by duplicating strokes of the visual feature 416 in the visual layer in the landmark layer as the visual feature 416 is sketched in the user interface 414, if the finger of the hand 116 is within the threshold distance of the digital landmark 418, then the finger of the hand 116 is also within the threshold distance of the visual feature 416.

With reference to FIG. 4B, the coordinates of the finger of the hand 116 in the user interface 414 are within the threshold distance of the coordinates of the digital landmark 418. The feedback module 204 generates the feedback data 210 as describing the indication that the finger of the hand 116 is within the threshold distance of the digital landmark 418. An output device 212 receives the feedback data 210 and processes the feedback data 210 to generate feedback which indicates to the user with low vision that the finger of the hand 116 is within the threshold distance of the visual feature 416. The output device 212 is representative of a variety of different devices that are capable of generating feedback. In one example, the output device 212 is a speaker device and the feedback is audio feedback. In another example, the output device 212 is a haptic device and the feedback is tactile feedback.

In some examples, the output device 212 is integrated into the display device 412 such an example in which the output device is a speaker device. In other examples, the output device 212 is communicatively coupled to the computing device 102 and/or the display device 412 via a wired or a wireless connection. These other examples include examples in which the output device 212 is worn by the user such as a smartwatch that is communicatively coupled to the computing device 102 via a wireless connection or headphones that are commutatively coupled to the computing device 102 via a wired or wireless connection. The output device 212 is capable of ranging from a full resource device with substantial memory and processor resources to a low-resource device with limited memory and/or processing resources (e.g., mobile devices).

In some examples, the output device 212 generates the feedback as non-visual feedback and the user leverages the feedback to locate the visual feature 416 within the user interface 414 in a manner which is possible with or without visually locating the visual feature 416. Consider an example in which the output device 212 is the speaker device and the feedback is audio feedback. In this example, output device 212 is capable of adjusting a volume or a frequency of the audio feedback to provide additional feedback. Similarly, the feedback module 204 is capable of generating the feedback data 210 to adjust the volume or the frequency of the audio feedback to provide the additional feedback. For example, the landmark module 110 increases or decreases the volume or the frequency of the audio feedback based on the distance between the coordinates of the user interface 414 that correspond to the finger of the hand 116 and the coordinates of the user interface 414 that correspond to the digital landmark 418 described by the distance data 208.

In an example, the landmark module 110 increases the volume or the frequency of the audio feedback as the distance described by the distance data 208 is decreased. In this example, the user with low vision leverages the increases or decreases in the volume or the frequency of the audio feedback to determine whether the finger of the hand 116 is closer to or further from the visual feature 416 as the user manipulates the finger of the hand 116 in the user interface 414. In another example, the feedback is tactile feedback (e.g., haptic feedback from a smartwatch) and the landmark module 110 increases or decreases a magnitude of the tactile feedback based on the coordinates of the user interface 414 that correspond to the finger of the hand 116 and the coordinates of the user interface 414 that correspond to the digital landmark 418 described by the distance data 208.

For example, the output device 212 is configured to generate the feedback in a manner such that the user with low vision is able to distinguish between feedback that indicates the coordinates of the finger of the hand 116 are near the digital landmark 418 in the user interface 414 and feedback that indicates the coordinates of the finger of the hand 116 are intersecting or overlapping the digital landmark 418 in the user interface 414. For instance, the output device 212 generates audio feedback having a particular tone or tactile feedback having a particular magnitude when the coordinates of the finger of the hand 116 are intersecting or overlapping the digital landmark 418 in the user interface 414.

Consider an example in which the user leverages the feedback having the particular tone or the particular magnitude when the coordinates of the finger of the hand 116 are intersecting or overlapping the digital landmark 418 in the user interface 414 to manipulate the stylus 120 with the user's other hand such that the stylus 120 is located at a location in the user interface 414 that is adjacent to a location of the finger of the hand 116 in the user interface 414. As shown in FIG. 4C, the user then relocates the finger of the hand 116 in the user interface 414 such that the finger of the hand 116 intersects or overlaps a different portion of the digital landmark 418 in the user interface 414 using the feedback generated by the output device 212 having the particular tone or the particular magnitude.

With reference to FIG. 4D, the user with low vision manipulates the stylus 120 in the user interface 414 to add a stroke of digital paint 420 to the visual feature 416. For example, the user generates the additional input data 118 as describing coordinates of the stylus 120 in the user interface 414 as the user manipulates the stylus 120 in the user interface 414 based on the feedback generated by the output device 212. The display module 206 receives and processes the additional input data 118 to render the stroke of digital paint 420 in the user interface 414.

As illustrated in FIG. 4E, the user with low vision manipulates the finger of the hand 116 to relocate the finger of the hand 116 in the user interface 414 such that the finger of the hand 116 intersects or overlaps another different portion of the digital landmark 418 in the user interface 414 using the feedback generated by the output device 212 having the particular tone or the particular magnitude. To do so in one example, the user initially drags the finger of the hand 116 in the user interface 414 that moves the finger of the hand 116 away from the digital landmark 418 and the visual feature 416 in the user interface 414. This interaction generates the input data 114 which the distance module 202 processes to generate the distance data 208. For instance, the feedback module 204 generates the feedback data 210 based on the distance data 208 and the output device 212 generates the feedback based on the feedback data 210. The user with low vision receives the feedback generated by the output device 212 and uses the feedback to drag the finger of the hand 116 to a location of the other different portion of the digital landmark 418 in the user interface 414 as shown in the representation 408.

With reference to FIG. 4F, the user manipulates the stylus 120 relative to the user interface 414 to add an additional stroke of digital paint 422 to the visual feature 416. The user generates the additional input data 118 as describing coordinates of the stylus 120 in the user interface 414 as the user actuates the stylus 120 in the user interface 414 towards the location of the other different portion of the digital landmark 418 and the finger of the hand 116. For example, the display module 206 receives and processes the additional input data 118 to render the additional stroke of digital paint 422 in the user interface 414.

As illustrated in the representation 410, the stroke of digital paint 420 and the additional stroke of digital paint 422 both accurately follow a geometry of an inner portion of the visual feature 416. For example, the user with low vision is capable of leveraging the feedback generated by the output device 212 and manipulating the finger of the hand 116 in the user interface 414 to identify portions of the visual feature 416 to receive digital paint. In this example, the user then manipulates the stylus 120 to add strokes of digital paint to the identified portions of the visual feature 416.

Although the examples are described with respect to systems for accessible digital painting, it is to be appreciated that the functionality made possible by the landmark module 110 is not limited to digital painting. For instance, the landmark module 110 is capable of integrating with any system for creating and editing digital content to make the system accessible for users with low or no vision. Additionally, although the examples are described as generating feedback based on coordinates of the finger of the hand 116 in the user interface 414, the landmark module 110 is equally capable of generating feedback based on coordinates of the stylus 120 in the user interface 414. For example, the user provides an input such as a voice input which causes the landmark module 110 to generate feedback based on the coordinates of the finger of the hand 116 and to generate feedback based on the coordinates of the stylus 120 in the user interface 414. In this example, the user identifies a portion of the user interface 414 to digitally paint using the feedback based on the coordinates of the finger of the hand 116 and the user ensures that a stroke of digital paint is applied to the portion of the user interface 414 using the feedback based on the coordinates of the stylus 120.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 5:
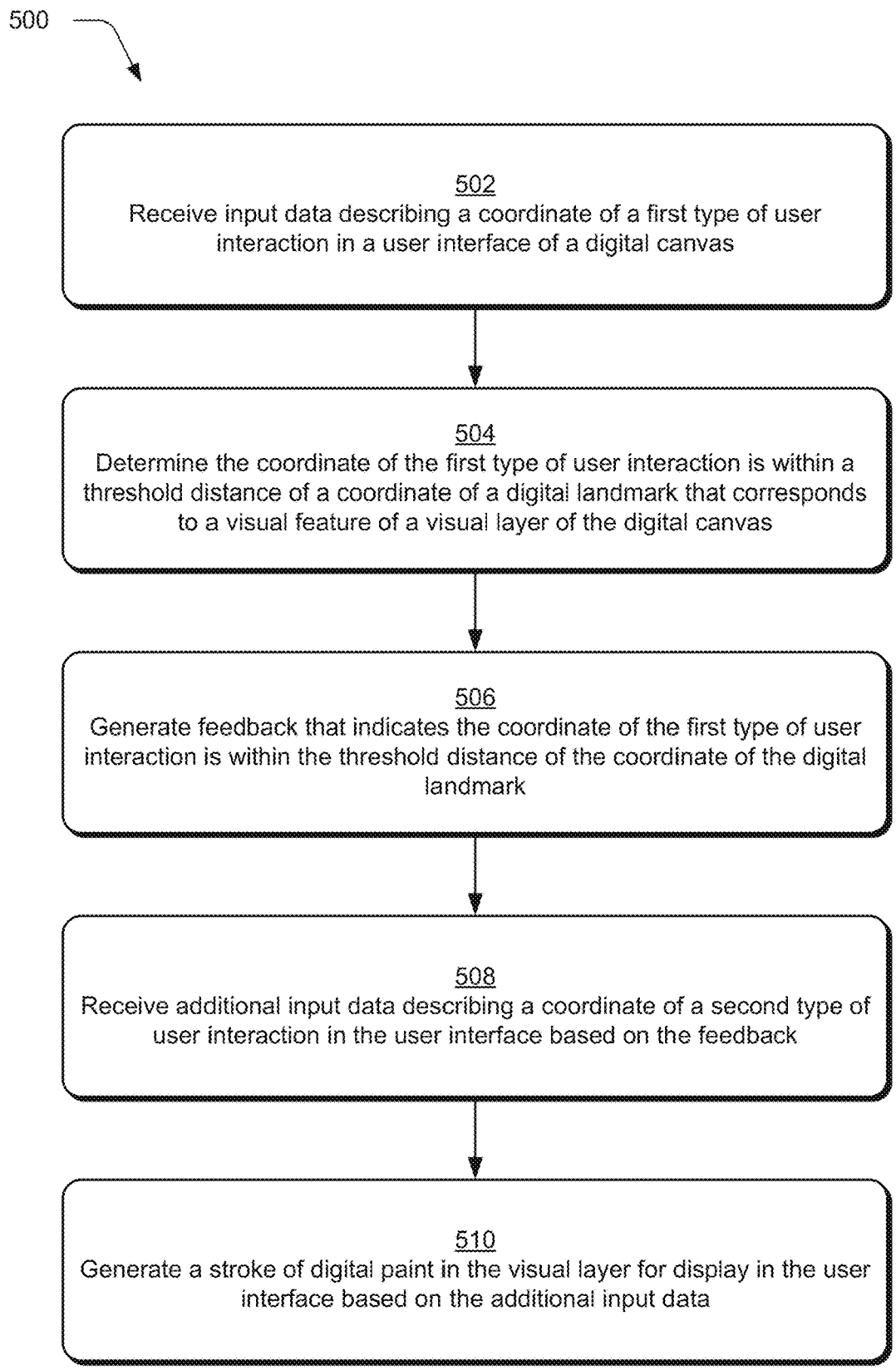
FIG. 5 is a flow diagram depicting a procedure in an example implementation in which a stroke of digital paint is generated for display in a user interface.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-4. FIG. 5 is a flow diagram depicting a procedure 500 in an example implementation in which a stroke of digital paint is generated for display in a user interface.

Input data is received describing a coordinate of a first type of user interaction in a user interface of a digital canvas (block 502). In an example, the computing device 102 implements the landmark module 110 to receive the input data. It is determined that the coordinate of the first type of user interaction is within a threshold distance of a coordinate of a digital landmark that corresponds to a visual feature of a visual layer of the digital canvas (block 504). For example, the landmark module 110 determines that the coordinate of the first type of user interaction is within the threshold distance of the coordinate of the digital landmark.

Feedback is generated that indicates the coordinate of the first type of user interaction is within the threshold distance of the coordinate of the digital landmark (block 506). In one example, the landmark module 110 generates the feedback that indicates the coordinate of the first type of user interaction is within the threshold distance of the coordinate of the digital landmark. Additional input data is received describing a coordinate of a second type of user interaction in the user interface based on the feedback (block 508). The landmark module 110 receives the additional input data in some examples. A stroke of digital paint is generated in the visual layer for display in the user interface based on the additional input data (block 510). For example, the landmark module 110 generates the stroke of digital paint for display in the user interface.

Example System and Device

Figure 6:
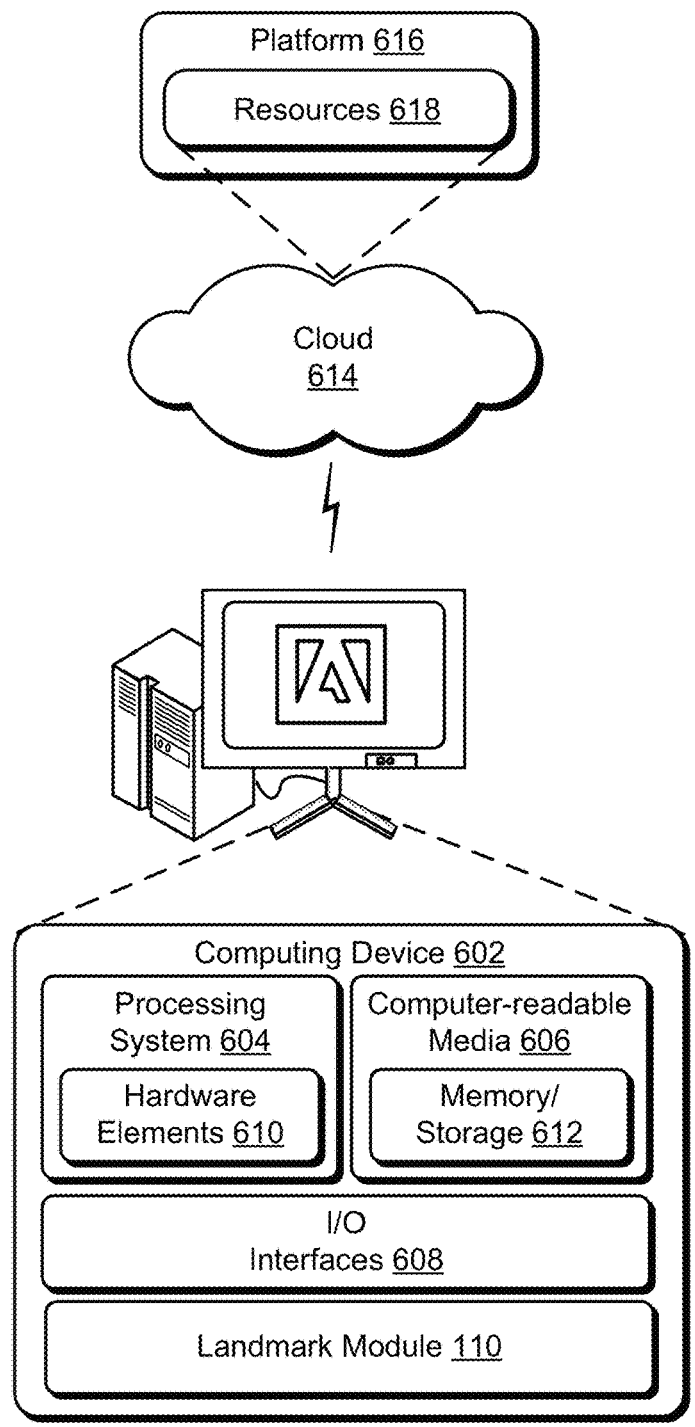
FIG. 6 illustrates an example system that includes an example computing device that is representative of one or more computing systems and/or devices for implementing the various techniques described herein.

FIG. 6 illustrates an example system 600 that includes an example computing device that is representative of one or more computing systems and/or devices that are usable to implement the various techniques described herein. This is illustrated through inclusion of the landmark module 110. The computing device 602 includes, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that are configured as processors, functional blocks, and so forth. This includes example implementations in hardware as an application specific integrated circuit or other logic device formed using one or more semiconductors. The hardware elements 610 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 606 is illustrated as including memory/storage 612. The memory/storage 612 represents memory/storage capacity associated with one or more computer-readable media. In one example, the memory/storage 612 includes volatile media (such as random access memory (RAM)) and/or nonvolatile media (such as read only memory (ROM), Flash memory, optical disks, magnetic disks, and so forth). In another example, the memory/storage 612 includes fixed media (e.g., RAM, ROM, a fixed hard drive, and so on) as well as removable media (e.g., Flash memory, a removable hard drive, an optical disc, and so forth). The computer-readable media 606 is configurable in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 602, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 610. For example, the computing device 602 is configured to implement particular instructions and/or functions corresponding to the software and/or hardware modules. Accordingly, implementation of a module that is executable by the computing device 602 as software is achieved at least partially in hardware, e.g., through use of computer-readable storage media and/or hardware elements 610 of the processing system 604. The instructions and/or functions are executable/operable by one or more articles of manufacture (for example, one or more computing devices 602 and/or processing systems 604) to implement techniques, modules, and examples described herein.

The techniques described herein are supportable by various configurations of the computing device 602 and are not limited to the specific examples of the techniques described herein. This functionality is also implementable entirely or partially through use of a distributed system, such as over a "cloud" 614 as described below.

The cloud 614 includes and/or is representative of a platform 616 for resources 618. The platform 616 abstracts underlying functionality of hardware (e.g., servers) and software resources of the cloud 614. For example, the resources 618 include applications and/or data that are utilized while computer processing is executed on servers that are remote from the computing device 602. In some examples, the resources 618 also include services provided over the Internet and/or through a subscriber network, such as a cellular or Wi-Fi network.

The platform 616 abstracts the resources 618 and functions to connect the computing device 602 with other computing devices. In some examples, the platform 616 also serves to abstract scaling of resources to provide a corresponding level of scale to encountered demand for the resources that are implemented via the platform. Accordingly, in an interconnected device embodiment, implementation of functionality described herein is distributable throughout the system 600. For example, the functionality is implementable in part on the computing device 602 as well as via the platform 616 that abstracts the functionality of the cloud 614.

CONCLUSION

Although implementations of systems for accessible digital painting have been described in language specific to structural features and/or methods, it is to be understood that the appended claims are not necessarily limited to the specific features or methods described. Rather, the specific features and methods are disclosed as example implementations of systems for accessible digital painting, and other equivalent features and methods are intended to be within the scope of the appended claims. Further, various different examples are described and it is to be appreciated that each described example is implementable independently or in connection with one or more other described examples.

What is claimed is:

1. A method comprising:
receiving, by a processing device in a user interface of a digital canvas, an input to sketch a visual feature in a visual layer of the digital canvas;
duplicating, by the processing device, a portion of a geometry of the visual feature to generate a digital landmark in a landmark layer of the digital canvas as a non-visual representation of a boundary of the visual feature;
receiving, by the processing device, an audio input to select the landmark layer;
receiving, by the processing device, input data describing a coordinate of a first type of user interaction in the user interface of the digital canvas;
determining, by the processing device, the coordinate of the first type of user interaction is within a threshold distance of a coordinate of the digital landmark in the landmark layer of the digital canvas;
generating, by the processing device, feedback that indicates the coordinate of the first type of user interaction is within the threshold distance of the coordinate of the digital landmark;
receiving, by the processing device, additional input data describing a coordinate of a second type of user interaction in the user interface based on the feedback; and
generating, by the processing device, a stroke of digital paint in the visual layer for display in the user interface based on the additional input data.

2. The method as described in claim 1, wherein the visual feature is a digital object and the landmark layer aligns the digital landmark with a perimeter of the digital object.

3. The method as described in claim 1, further comprising modifying the feedback based on a distance between the coordinate of the first type of user interaction and the coordinate of the digital landmark.

4. The method as described in claim 3, wherein the additional input data is received based on the modified feedback.

5. The method as described in claim 1, wherein the feedback is non-visual feedback.

6. The method as described in claim 5, wherein the feedback is audio feedback or tactile feedback.

7. The method as described in claim 1, wherein the first type of user interaction is a touch input and the feedback is usable to non-visually locate the visual feature in the user interface.

8. The method as described in claim 1, further comprising receiving an additional audio input to add an additional landmark layer to the digital canvas and tracking a user interaction in the user interface to add an additional digital landmark to the additional landmark layer based on the user interaction.

9. A system, comprising:
a memory component; and
a processing device coupled to the memory component, the processing device to perform operations comprising:
receiving, in a user interface of a digital canvas, an input to sketch a visual feature in a visual layer of the digital canvas;
duplicating a portion of a geometry of the visual feature to generate a digital landmark in a landmark layer of the digital canvas as a non-visual representation of a boundary of the visual feature, the landmark layer aligning the digital landmark to a perimeter of the visual feature;
receiving an audio input to select the landmark layer;
receiving input data describing a coordinate of a first type of user interaction in the user interface of the digital canvas;
determining the coordinate of the first type of user interaction is within a threshold distance of a coordinate of the digital landmark in the landmark layer of the digital canvas that represents the boundary of the visual feature;
generating feedback that indicates the coordinate of the first type of user interaction is within the threshold distance of the coordinate of the digital landmark in the landmark layer and a coordinate of the boundary of the visual feature;
receiving additional input data describing a coordinate of a second type of user interaction in the user interface based on the feedback; and
generating a stroke of digital paint in the visual layer for display in the user interface based on the additional input data.

10. The system as described in claim 9, wherein the feedback is audio feedback.

11. The system as described in claim 9, wherein the feedback is tactile feedback.

12. The system as described in claim 9, wherein the first type of user interaction is a touch input and the feedback is usable to non-visually locate the visual feature in the user interface.

13. The system as described in claim 9, wherein the digital landmark is an outline of the visual feature and is not displayed visually in the digital canvas.

14. The system as described in claim 9, wherein the input to sketch the visual feature includes one or more strokes and the duplicating the portion of the geometry of the visual feature includes duplicating one or more of the strokes in the landmark layer.

15. A non-transitory computer-readable storage medium storing executable instructions, which when executed by a processing device, cause the processing device to perform operations comprising:
duplicating a portion of a geometry of a visual feature included in a visual layer of a digital canvas to generate a digital landmark in a landmark layer of the digital canvas as a non-visual representation of a boundary of the visual feature;
receiving an audio input to select the landmark layer;
receiving input data describing a coordinate of a first type of user interaction in a user interface of a digital canvas;
determining a distance between the coordinate of the first type of user interaction and a coordinate of the digital landmark in a landmark layer of the digital canvas;
generating non-visual feedback that corresponds to the distance, the non-visual feedback is modulated based on a change in the distance of the coordinate of the first type of user interaction to the coordinate of the digital landmark;
receiving additional input data describing a coordinate of a second type of user interaction in the user interface based on the non-visual feedback; and
generating a stroke of digital paint in the visual layer for display in the user interface based in the additional input data.

16. The non-transitory computer-readable storage medium as described in claim 15, wherein the non-visual feedback is audio feedback and a volume of the non-visual feedback increases as the distance is decreased.

17. The non-transitory computer-readable storage medium as described in claim 15, wherein the landmark layer is selected from a group of landmark layers using the audio input.

18. The non-transitory computer-readable storage medium as described in claim 15, wherein the first type of user interaction is a touch input and the non-visual feedback is usable to non-visually locate the visual feature in the user interface.

19. The non-transitory computer-readable storage medium as described in claim 15, wherein the non-visual feedback is tactile feedback and a magnitude of non-visual feedback increases as the distance is decreased.

20. The non-transitory computer-readable storage medium as described in claim 15, wherein the operations further include generating the digital landmark using a machine learning model trained to detect and bound digital objects within bounding objects, the digital landmark representing a bounding object for the visual feature.

* * * * *